United States Patent [19]

Rumreich

[11] Patent Number: 5,576,770
[45] Date of Patent: Nov. 19, 1996

[54] ADAPTIVE SYNCHRONIZING SIGNAL SEPARATOR

[75] Inventor: Mark F. Rumreich, Indianapolis, Ind.

[73] Assignee: Thomson Consumer Electronics, Inc., Indianapolis, Ind.

[21] Appl. No.: 349,780

[22] Filed: Dec. 6, 1994

[51] Int. Cl.⁶ ........................................ H04N 5/04
[52] U.S. Cl. ...................... 348/525; 348/500; 375/354
[58] Field of Search ........................ 348/500, 525, 348/533, 565, 521, 568, 683, 696, 697; 375/354, 355, 364; H04N 5/04, 9/44, 5/48, 5/18, 5/16, 5/92, 5/14, 7/13

[56] References Cited

U.S. PATENT DOCUMENTS

| | | | |
|---|---|---|---|
| 3,706,847 | 12/1972 | Smeulers | 178/7.35 |
| 4,185,299 | 1/1980 | Harford | 358/153 |
| 4,385,319 | 5/1983 | Hasegawa | 358/153 |
| 4,621,289 | 11/1986 | Bart et al. | 358/153 |
| 4,628,361 | 12/1986 | Andreas | 358/153 |
| 4,707,740 | 11/1987 | Stratton | 358/153 |
| 4,723,165 | 2/1988 | Bart | 358/153 |
| 5,003,564 | 3/1991 | Fling | 377/45 |
| 5,027,017 | 6/1991 | Fling | 307/555 |
| 5,162,909 | 11/1992 | Lagoni et al. | 348/525 |
| 5,280,356 | 1/1994 | Hiramatsu et al. | 348/525 |

OTHER PUBLICATIONS

ITT Semiconductors, *VSP 2860 Video/Snyc Processor, 3.6 Sync Processing and Deflection*, Edition Dec. 1, 1989, 6251-310-2E, p. 21.

*Primary Examiner*—Safet Metjahic
*Assistant Examiner*—Nina N. West
*Attorney, Agent, or Firm*—Joseph S. Tripoli; Joseph J. Laks; Harvey D. Fried

[57] ABSTRACT

A digital clamp combines a digitized luminance signal with a DC offset to clamp the back porch portions of the luminance signal to a predetermined IRE level. The clamp generates a reference signal having successive values indicative of successive IRE levels of the back porch portions prior to being clamped. A summer generates successive slice level values indicative of successive averages of the reference signal values and a fixed value. A limiter restricts the successive slice level values to a range of slice levels. A comparator generates a composite synchronizing signal by comparing the luminance signal to the successive slice level values, as limited.

26 Claims, 4 Drawing Sheets

ADAPTIVE SYNCHRONIZING SIGNAL SEPARATOR

BACKGROUND OF THE INVENTION

1. Field of the Invention

This invention relates to the field of synchronizing signal separators, and in particular, to the field of adaptive synchronizing signal separators as may be incorporated into an integrated circuit.

2. Description of Related Art

An integrated synchronizing signal separator is utilized in an integrated circuit processor for an auxiliary video signal appearing as the inset picture in a picture-in-picture display, often referred to as a PIP display. The integrated circuit is known as the DPIPIC, and is utilized in television receivers manufactured by Thomson Consumer Electronics, Inc. The integrated synchronizing signal separator in the DPIPIC includes an analog synchronizing signal tip clamp, an analog is to digital converter, a digital low pass filter, a comparator, a horizontal phase locked loop, a nonlinear filter and a digital back porch clamp. The video signal for the auxiliary picture in the PIP display is synchronizing signal tip clamped, digitized and then low pass filtered. A synchronizing signal slicing comparator compares the low pass filtered signal, which represents the luminance component of the auxiliary video signal, to a reference slicing level of about −25 IRE, which is about 15 IRE above the nominal synchronizing signal tip level of −40 IRE. The output of the comparator is a composite synchronizing signal. The horizontal synchronizing signal is separated by a horizontal phase locked loop and the vertical synchronizing signal is separated by the nonlinear filter. The separated horizontal synchronizing signal is an input to a digital back porch clamp, which also receives the luminance component as an input, but which does not otherwise play a part in the synchronizing signal separation. A clamped luminance signal from the digital back porch clamp is used for further video processing in the integrated circuit.

The foregoing approach works well under typical signal conditions, but is more prone to failure when the synchronizing signal is compressed or the signal is noisy. When the synchronizing signal is compressed, errors can result when the video level drops below the slicing threshold. In order to minimize this, the slicing level can be set closer to the synchronizing signal tip level than the −20 IRE level, which is nominally the half way point between synchronizing signal tip and back porch. This degrades noise immunity, but is generally considered the best compromise. The level of performance using a fixed synchronizing signal slicing threshold level is deemed marginally acceptable, as compared to the synchronizing signal processing circuitry for the main video picture, because loss of the synchronizing signal can occur in signals which are weak or have a compressed synchronizing signal, but which are otherwise watchable. In other words, the signal would be watchable as a main picture, but not as an auxiliary picture.

An alternative to a fixed synchronizing signal slicing level is utilized in the ITT digital chip set. The synchronizing signal separator in the ITT digital chip set has two modes of operation. The synchronizing signal slicing level is fixed during synchronizing signal acquisition as in the DPIPIC. After synchronization is established, the synchronizing signal slicing level is set to one half (50%)of the synchronizing signal pulse amplitude by averaging the synchronizing signal tip level and the black level, corresponding to the back porch. This reduces the probability of false triggering due to video levels, because the synchronizing signal slicing level can move closer to back porch as the synchronizing signal tip moves closer to back porch, at least up to a point. Noise immunity is enhanced when the synchronizing signal tip moves away from back porch, because the synchronizing signal slicing level moves away from back porch, at least up to a point. The point at which the improvement from the ITT chip set stops still falls short of a performance level which is substantially comparable to the synchronizing signal separation in the main video channel processing.

SUMMARY OF THE INVENTION

Even better performance can be achieved if the synchronizing signal slicing level is adjusted over a larger range to accommodate a larger range of variation of the synchronizing signal tip level, without regard to the dual mode system or the 50% level limitation of the ITT chip set.

In accordance with an inventive aspect, the digital back porch clamp provides a digital value corresponding to the back porch before clamping. This number is averaged with a synchronizing signal tip reference number which may or may not be the true synchronizing signal tip value. The result of the averaging is limited, and then used as an adaptive synchronizing signal slice threshold level. There are two principle differences between the inventive approach and the approach of the ITT chip set. Firstly, the synchronizing signal tip slicing level may be offset from half way between the synchronizing signal tip level and the blanking (black) level. This optimizes the actual weak synchronizing signal tip level to noise performance, and compensates for leakage in the analog clamp and the nonlinear characteristics of noise. The weak signal threshold may be below the half way point, for example by a further 4 IRE. Secondly, a limiter is provided after the averager. The limiter restricts the range of the synchronizing signal tip slicing threshold to a nominal one half (50%) value, for example approximately −20 IRE, and a range of ±10 IRE relative to the nominal one half value. This range represents approximately 25% to approximately 75% of a nominal synchronizing signal tip value of 40 IRE. This aids in acquisition and prevents latch up or oscillation. The improvement in performance is dramatic, and approaches the performance of a vertical countdown synchronizing signal separator.

An adaptive synchronizing signal separator in accordance with an inventive arrangement comprises: a source of a digitized luminance signal, the signal including successive synchronizing components disposed on successive back porch portions; means for successively clamping the back porch portions to a predetermined IRE level; means for generating an output reference signal having successive values indicative of successive IRE levels of the successive back porch portions prior to operation of the clamping means; means for generating successive slice level values indicative of a numerical relationship of the reference signal value and a fixed value; means for limiting the successive slice level values to a range of slice levels; and, means for generating a composite synchronizing signal by comparing the digitized luminance signal to the successive slice level values, as limited.

In a presently preferred embodiment, the clamping means combines the luminance signal with a DC offset value to establish the predetermined IRE level of the back porch portions, for example zero volts, and the output reference signal is indicative of the DC offset value, for example a fraction of the DC offset level.

DETAILED DESCRIPTION OF THE PREFERRED EMBODIMENTS

Figure 1:
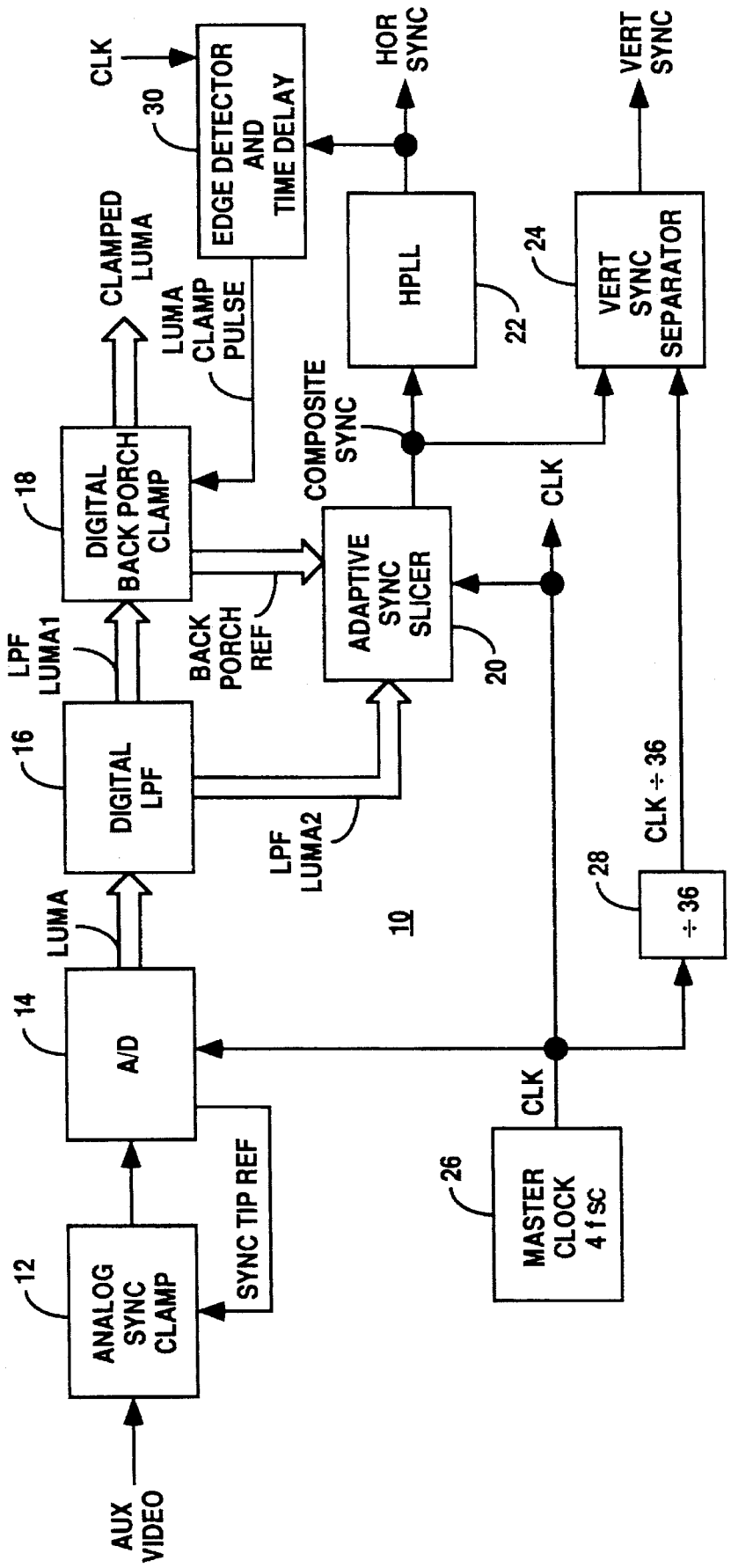
FIG. 1 is a block diagram a synchronizing signal separator according to an inventive arrangement.

A synchronizing signal separator 10 according to an inventive arrangement is shown in block diagram form in FIG. 1. An auxiliary video signal, which is to be the source of an inset picture of a picture-in-picture display, is an input to an analog synchronizing signal clamp circuit 12. The clamped analog signal is an input to an analog to digital converter 14, an output of which is a luminance signal (LUMA) including horizontal and vertical synchronizing components. A synchronizing signal tip reference for the analog clamp 12 is taken, for example, from the resistive ladder of the analog to digital converter 14. The luminance signal is an input to a digital low pass filter 16. One low pass filtered luminance signal LPF LUMA1 is a first output of the low pass filter 16. The luminance signal LPF LUMA1 is an input to a digital back porch clamp circuit 18. The output of clamp circuit 18 is a clamped digital luminance signal designated CLAMPED LUMA. Another low pass filtered luminance signal LPF LUMA2 is a second output of the low pass filter 16. The luminance signal LPF LUMA2 is an input to a digital adaptive synchronizing signal slicer circuit 20.

Whether or not the luminance signals LPF LUMA1 and LPF LUMA2 are the same, or are the result of being low pass filtered through filters having different frequency responses, will depend on subsequent processing requirements. Whether or not low pass filter 16 has different outputs with the same or different frequencies, or whether or not low pass filter 16 is embodied as separate low pass filters for generating the LPF LUMA 1 and LPF LUMA2 signals respectively, with the same or different frequency response, is not critical to the adaptive synchronizing signal slicer taught herein.

The adaptive synchronizing signal slicer circuit 20 also receives a back porch reference signal from the clamp circuit 18. The adaptive synchronizing signal slicer 20 generates a composite synchronizing signal (COMPOSITE SYNC) output, which is an input to a horizontal phase locked loop (HPLL) 22 and a nonlinear vertical synchronizing signal separator (VERT SYNC SEPARATOR) 24, which regenerate horizontal and vertical synchronizing components respectively.

The horizontal synchronizing signal is an input to an edge detector and delay circuit 30. Horizontal synchronizing pulses are edge detected by circuit 30 and delayed versions thereof are supplied as a timing signal, LUMA CLAMP PULSE, to the back porch clamp 18.

A master clock 26 generates a clock signal (CLK) at four times the frequency of the color subcarrier, designated 4 fSC. This clock is supplied to the analog to digital converter 14 and the adaptive synchronizing signal slicer 20. At this rate, the analog to digital converter provides 910 digital samples for each horizontal line. The CLK signal is also divided by 36 in divider 28, to generate a lower frequency clock signal (CLK÷36)used by the vertical filter 24.

Figure 2:
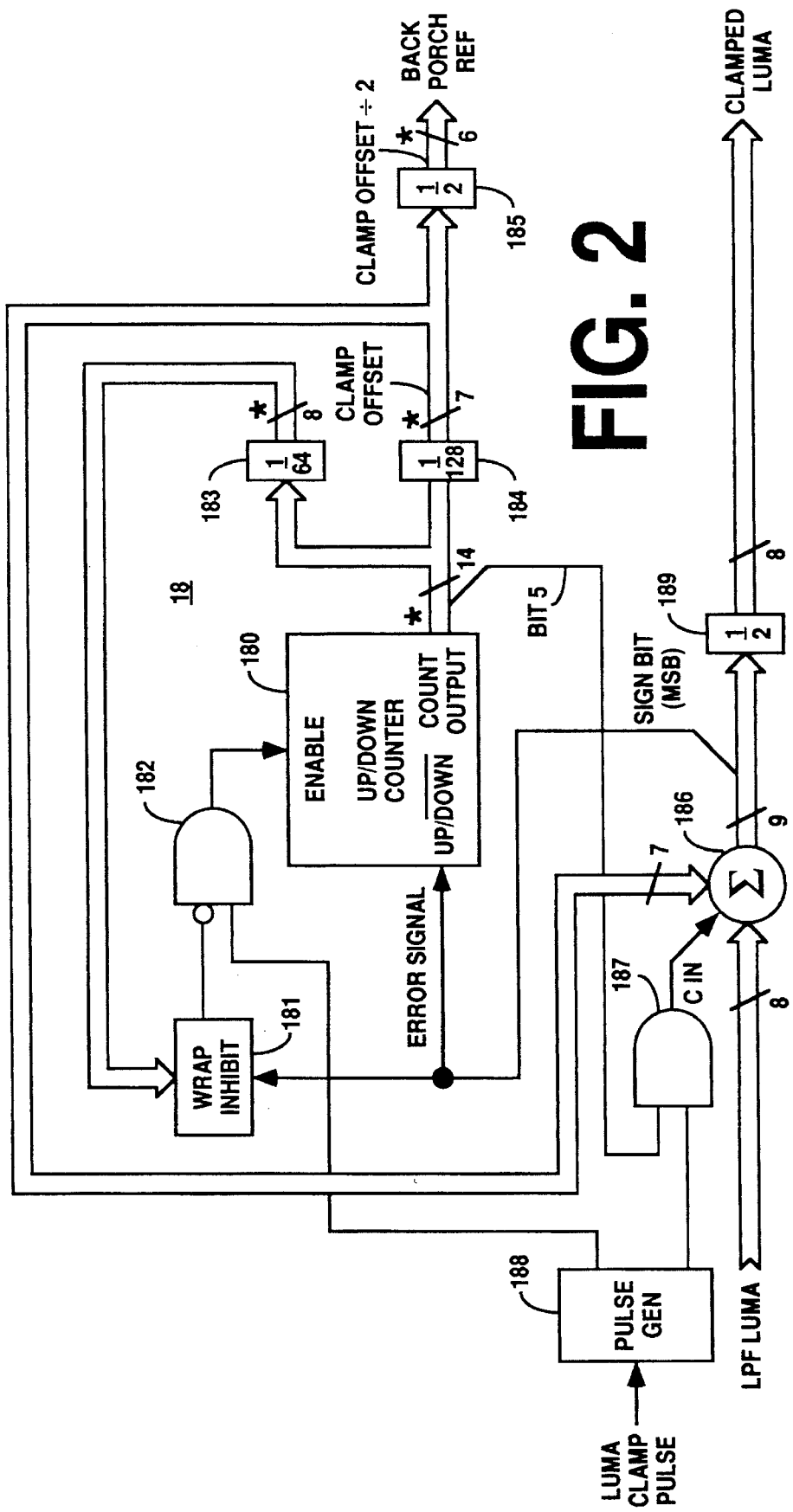
FIG. 2 is a block diagram of a digital back porch clamp suitable for use with the synchronizing signal separator of FIG. 1.
Figure 3:
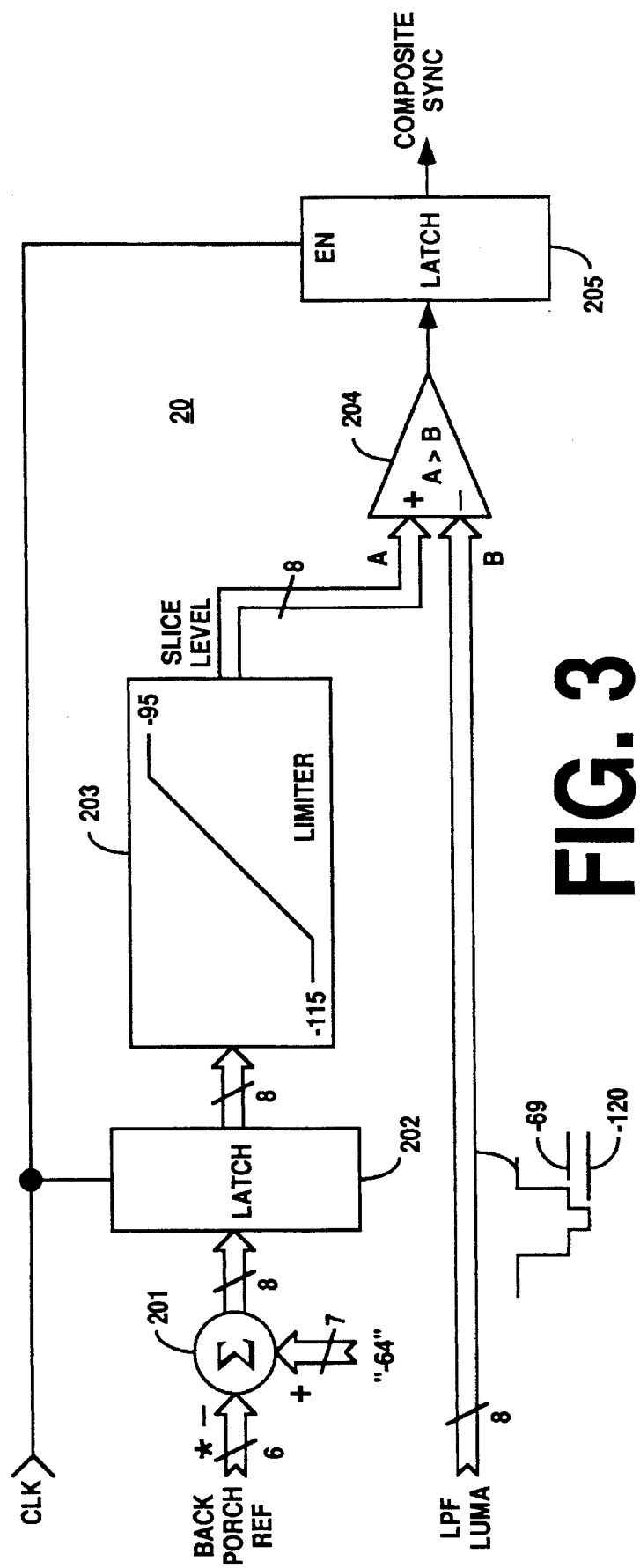
FIG. 3 is a block diagram of an adaptive synchronizing signal slicer suitable for use with the synchronizing signal separator of FIG. 1.
Figure 4:
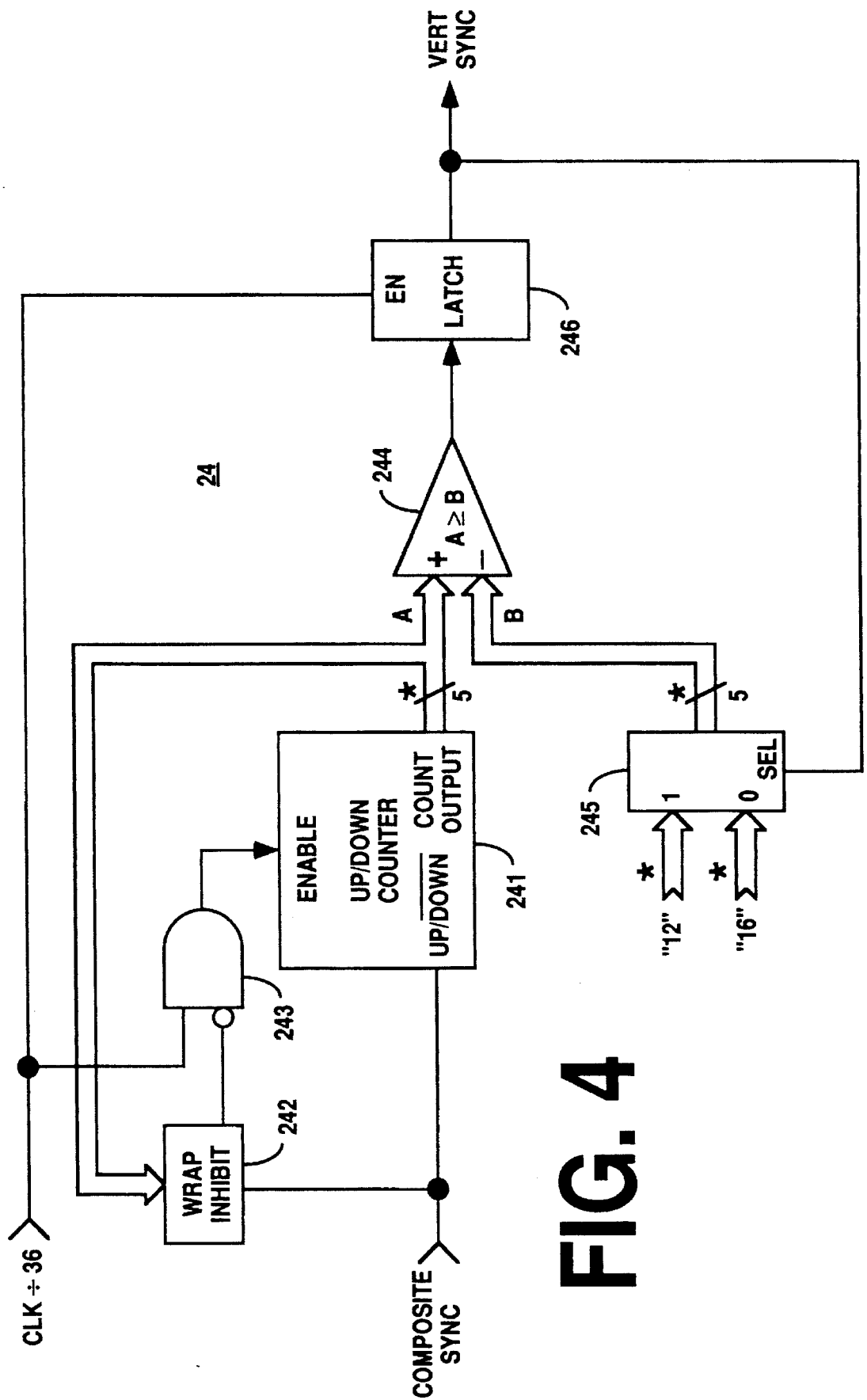
FIG. 4 is a block diagram of a vertical filter suitable for use with the synchronizing signal separator of FIG. 1.

The digital back porch clamp 18, the adaptive synchronizing signal slicer 20 and the vertical filter 24 are shown in FIGS. 2, 3 and 4, respectively. In each of these figures, some of the multiple bit digital signals are denoted by an asterisk (*) symbol. All such signals marked by an asterisk are unsigned signals, indicating only magnitude. All such signals without an asterisk are in two's-complement format. In two's-complement format, the leading binary digit is used to represent the sign and the remaining bits are used to represent the magnitude. A negative number is obtained by complementing all of the bits of the corresponding positive number, and adding one unit in the position of the least significant digit. The largest negative number represented by n bits is one unit larger in magnitude than the largest positive number which can be represented by n bits. Since there is only one representation for the number 0, there are $2^n$ distinct numbers which can be represented by an n-bit word. Subtraction in two's-complement format is particularly convenient, being performed by using an adder and a two's complementer. It is not necessary to use two's-complement format to implement the invention taught herein.

With reference to FIG. 2, the back porch clamp 18 is responsive to low pass filtered luma signal LPF LUMA, for example LPF LUMA1, and the LUMA CLAMP PULSE signal. The clamp generates the back porch reference signal BACK PORCH REF and a clamped luma signal CLAMPED LUMA. The basic object of the clamp is to add a DC offset to the incoming luma signal LPF LUMA so that the back porch level of the output signal CLAMPED LUMA is always at a digital 0 level. The entire circuit 18, except for divider 185 may be thought of as a servo for providing the necessary DC offset.

The DC offset is generated from the output of an up/down counter 180, which counts up once per horizontal line, if the incoming back porch level is below 0, or which counts down once per horizontal line, if the incoming back porch level is above 0 level. The counter is enabled by the output of a pulse generator 188, which is responsive to the LUMA CLAMP PULSE input signal. Each output of the pulse generator 188 is a one system clock wide pulse which occurs once per horizontal line, during back porch. This pulse is an input to a gate 182, the other input to which is an output from a wrap inhibit circuit 181. The wrap inhibit circuit includes a count decoder responsive to as the magnitude of the output of divider 183, which divides the magnitude of the output of the counter by 64.

The DC offset is an output of divider 184, which divides the magnitude of the output of the counter by 128. The effect of divider 184 is that 128 consecutive counts of the counter, either up or down, are required before the DC offset value increments or decrements by one count. The DC offset value is one input to a summing circuit 186. A second input is the LPF LUMA input signal. A third input is a carry in bit C IN generated by gate 187. The inputs to gate 187 are another pulse output of pulse generator 188 and bit 5 of the output of the counter. The output of pulse generator 188 may occur a few master clock counts after the output supplied to gate 182. The CLAMPED LUMA output is generated by divider 189, which divides the output of the summing circuit 186 by 2, resulting in an 8-bit signal. The most significant bit MSB of the output of the summing circuit 186 is the sign bit. The SIGN BIT (MSB) represents the error signal which controls the counting direction of the counter 180. The SIGN BIT (MSB) signal is also an input to the wrap inhibit circuit 181.

The signal of particular interest is the output of divider 185, BACK PORCH REF, which represents the magnitude of the output of divider 128 further divided by 2. The BACK PORCH REF signal is one half of the DC offset value, and accordingly, is supplied to the adaptive synchronizing signal slicer circuit 20 as representing an estimate of one half of the LPF LUMA synchronizing signal amplitude.

The adaptive synchronizing signal slicer 20 is shown in FIG. 3. The BACK PORCH REF signal is one input to a summing circuit 201. The other input to summing circuit 201 is a fixed numerical reference offset value. In the presently preferred embodiment, the numerical reference offset value is −64. The output of the summing circuit 201 is stored in a latch 202. The output of the latch 202 is limited to a range of values-by limiter circuit 203. In the presently preferred embodiment, the range of the limiter is from −115 to −95. This represents a range of ±10 IRE. The SLICE LEVEL output of limiter 203 is coupled to the noninverting A input of a comparator 204. The LPF LUMA, for example, LPF LUMA2, is coupled to the inverting input B of the comparator 204. A nominal waveform with IRE values is illustrated. The comparator 204 generates an output when A>B. The output of the comparator 204 is stored in a latch 205. Latch 205 and latch 202 are enabled by the master clock signal CLK. The COMPOSITE SYNC output signal of latch 205 is low whenever the LPF LUMA input signal is below the slice level. Otherwise the COMPOSITE SYNC signal is high. The synchronizing signal slice level is thereby adjusted to always be approximately half way between the back porch level and the synchronizing signal tip level.

The COMPOSITE SYNC output signal of latch 205 is an input to the phase locked loop circuit 22, shown in FIG. 1, and the vertical filter 24, shown in detail in FIG. 4. The horizontal phase locked loop 22 is conventional, and not shown in detail.

With reference to FIG. 4, the nonlinear vertical synchronizing signal separator 24 comprises an up/down counter 241, enabled by the CLK+36 signal, controlled though a gate 243, which itself is controlled by a wrap inhibit circuit 242. The COMPOSITE SYNC signal determines whether the counter counts up or down, when enabled by the CLK+36 signal. The output of the counter is coupled to the noninverting A input of a comparator 244. The inverting input B is coupled to the output of a multiplexer switch 245, which sets the slicing level of the comparator 244. The comparator 244 generates an output when A≧B. The output of the comparator 244 is stored in a latch 246, which is also clocked by the CLK+36 signal. The output of latch 246 is the separated vertical synchronizing signal VERT SYNC. The VERT SYNC signal also controls switch 245. The alternate slicing levels provide hysteresis which inhibits jitter of the VERT SYNC signal.

The invention may be embodied in other specific forms without departing from the spirit or essential attributes thereof. Reference should be made to the appended claims, rather than merely the specification and drawings, as indicating the true scope of the invention.

What is claimed is:

1. An adaptive synchronizing signal separator, comprising:
   a source of a digitized luminance signal, said signal including a synchronizing component disposed on a back porch portion;
   means for clamping said back porch portion to a predetermined level;
   means for generating an output reference signal having a value indicative of successive IRE levels of said back porch portion prior to operation of said means for clamping;
   means for generating slice level values indicative of a numerical relationship of said reference signal value and a fixed value; and,
   means for generating a composite synchronizing signal by comparing said digitized luminance signal to said slice level values.

2. The synchronizing signal separator of claim 1, wherein said clamping means combines said luminance signal with a DC offset value to establish said predetermined level of said back porch portion.

3. The synchronizing signal separator of claim 1, wherein said means for clamping combines said luminance signal with a DC offset value to establish said predetermined level of said back porch portion and said output reference signal is indicative of said DC offset value.

4. The synchronizing signal separator of claim 1, wherein said means for clamping combines said luminance signal with a DC offset value to establish said predetermined level of said back porch portion and said output reference signal is a fraction of said DC offset value.

5. The synchronizing signal separator of claim 1, further comprising means for limiting said slice level values to a range of slice levels, said means for generating said composite synchronizing signal comparing said digitized luminance signal to said slice level values as limited.

6. The synchronizing signal separator of claim 1, wherein said numerical relationship of said reference signal value and said fixed value is an average.

7. The synchronizing signal separator of claim 5, wherein said range of slice levels is approximately −20 IRE±10 IRE.

8. The synchronizing signal separator of claim 5, wherein said range of said slice levels is from approximately 25% to approximately 75% of nominal synchronizing signal tip value.

9. The synchronizing signal separator of claim 1, wherein said means for generating said output reference signal comprises a divider responsive to a DC offset value generated by said clamping means to establish said predetermined IRE level of said back porch portion.

10. An adaptive synchronizing signal separator, comprising:
    a source of a digitized luminance signal, said signal including a synchronizing component disposed on a back porch portion;
    a clamp responsive to said luminance signal for generating a DC offset value and combining said DC offset value with said luminance signal to adjust said back porch portion to a predetermined level, said clamp providing an output reference signal having a value indicative of successive IRE levels of said back porch portion prior to operation of said clamp;
    a summer for generating slice level values indicative of a numerical relationship of said reference signal value and a fixed value;
    a limiter for restricting said slice level values to a range of slice levels; and,
    a comparator for generating a composite synchronizing signal by comparing said digitized luminance signal to said successive slice level values, as limited.

11. An adaptive synchronizing signal separator, comprising:
    a source of a luminance signal, said signal including a synchronizing component disposed on a back porch portion;

means for clamping said back porch portion to a predetermined level;

means for generating an output reference signal having values indicative of successive IRE levels of said back porch portion prior to operation of said means for clamping;

means for generating a slice level value indicative of a numerical relationship of said reference signal value and a fixed value; and, means for generating a composite synchronizing signal by comparing said luminance signal to said slice level value.

12. The synchronizing signal separator of claim 11, wherein said means for clamping combines said luminance signal with a DC offset value to establish said predetermined level of said back porch portion.

13. The synchronizing signal separator of claim 11, wherein said means for clamping combines said luminance signal with a DC offset value to establish said predetermined level of said back porch portion and said output reference signal is indicative of said DC offset value.

14. The synchronizing signal separator of claim 11, wherein said means for clamping combines said luminance signal with a DC offset value to establish said predetermined level of said back porch portion and said output reference signal is a fraction of said DC offset value.

15. The synchronizing signal separator of claim 14, wherein said fraction is approximately one half (½).

16. The synchronizing signal separator of claim 11, wherein said numerical relationship of said reference signal value and said fixed value is an average.

17. The synchronizing signal separator of claim 11, further comprising means for limiting said slice level values to a range of slice levels.

18. The synchronizing signal separator of claim 17, wherein said range of slice levels is approximately −20 IRE±10 IRE.

19. The synchronizing signal separator of claim 17, wherein said range of said slice levels is from approximately 25% to approximately 75% of nominal synchronizing signal tip value.

20. The synchronizing signal separator of claim 1, wherein said means for generating said output reference signal comprises a divider responsive to a DC offset value generated by said means for clamping to establish said predetermined level of said back porch portion.

21. An adaptive synchronizing signal separator, comprising:

a source of a video signal, said video signal including a synchronizing component disposed on a back porch portion;

means for clamping said back porch portion to a predetermined level;

means for generating an output reference signal having a value indicative of successive IRE levels of said back porch portion prior to operation of said means for clamping;

means for generating slice level values indicative of a numerical relationship of said reference signal value and a fixed value; and, means for generating a composite synchronizing signal by comparing said video signal to said slice level values.

22. The synchronizing signal separator of claim 21, wherein said means for clamping combines said video signal with a DC offset value to establish said predetermined level of said back porch portion.

23. The synchronizing signal separator of claim 22, wherein said output reference signal is indicative of said DC offset value.

24. The synchronizing signal separator of claim 21, wherein said numerical relationship of said reference signal value and said fixed value is an average.

25. The synchronizing signal separator of claim 21, further comprising means for limiting said slice level values to a range of slice levels, said means for generating said composite synchronizing signal comparing said video signal to said slice level values as limited.

26. The synchronizing signal separator of claim 25, wherein said means for generating said output reference signal, said means for generating said slice level values, said means for generating said composite synchronizing signal and said limiting means are embodied within an integrated circuit.

* * * * *